United States Patent
Moulsley et al.

(10) Patent No.: US 10,158,470 B2
(45) Date of Patent: Dec. 18, 2018

(54) METHOD FOR OPERATING A RADIO STATION IN A MOBILE NETWORK

(75) Inventors: Timothy James Moulsley, Caterham (GB); Milos Tesanovic, Swindon (GB); Choo Chiap Chiau, Hertfordshire (GB); Robert James Davies, Milton (GB)

(73) Assignee: Koninklijke Philips N.V., Eindhoven (NL)

( * ) Notice: Subject to any disclaimer, the term of this patent is extended or adjusted under 35 U.S.C. 154(b) by 341 days.

(21) Appl. No.: 12/858,963

(22) Filed: Aug. 18, 2010

(65) Prior Publication Data

US 2011/0045859 A1 Feb. 24, 2011

(30) Foreign Application Priority Data

| Aug. 18, 2009 | (EP) | 09168118 |
| Oct. 6, 2009 | (EP) | 09172328 |
| Oct. 13, 2009 | (EP) | 09172935 |
| Oct. 15, 2009 | (EP) | 09173188 |
| Jul. 28, 2010 | (WO) | PCT/IB2010/053433 |

(51) Int. Cl.
*H04B 7/00* (2006.01)
*H04L 5/00* (2006.01)

(52) U.S. Cl.
CPC .......... *H04L 5/0051* (2013.01); *H04L 5/0023* (2013.01)

(58) Field of Classification Search
CPC ... H04L 5/0023; H04L 5/0025; H04L 5/0048; H04L 5/0051; H04L 5/0053; H04L 5/0091; H04L 5/0073; H04W 72/046; H04W 72/08
See application file for complete search history.

(56) References Cited

U.S. PATENT DOCUMENTS

| 2002/0122502 A1* | 9/2002 | El-Gamal | H04L 1/0059 375/267 |
| 2008/0260062 A1 | 10/2008 | Imamura | |
| 2009/0011767 A1 | 1/2009 | Malladi et al. | |
| 2009/0046645 A1* | 2/2009 | Bertrand et al. | 370/329 |
| 2009/0141690 A1 | 6/2009 | Fan et al. | |
| 2009/0249027 A1 | 10/2009 | Kim et al. | |
| 2010/0035555 A1* | 2/2010 | Bala | H04B 7/024 455/63.1 |
| 2010/0135242 A1* | 6/2010 | Nam et al. | 370/330 |

(Continued)

FOREIGN PATENT DOCUMENTS

WO 2009019763 A1 2/2009

OTHER PUBLICATIONS

Qualcomm Europe, "Further Considerations and Link Simulations on Reference Signals in LTE-A", 3GPP TSG-RAN WG1 #56, R1-090875, Feb. 9-13, 2009, pp. 1-6.

(Continued)

*Primary Examiner* — Aristocratis Fotakis

(57) ABSTRACT

The present invention relates to a secondary station comprising means for communicating with at least one primary station, the secondary station comprising means for receiving from the primary station a subset of reference symbols selected out a set of possible reference symbols, the reference symbols of the subset being associated with a spatial channel, wherein a transmission characteristic of the subset of reference symbols depends on the spatial channel.

22 Claims, 2 Drawing Sheets

(56) References Cited

U.S. PATENT DOCUMENTS

| | | | |
|---|---|---|---|
| 2010/0142466 A1* | 6/2010 | Palanki et al. | 370/329 |
| 2010/0189038 A1* | 7/2010 | Chen et al. | 370/328 |
| 2010/0195599 A1* | 8/2010 | Zhang et al. | 370/329 |
| 2010/0272032 A1* | 10/2010 | Sayana et al. | 370/329 |
| 2010/0272040 A1* | 10/2010 | Nam et al. | 370/329 |
| 2010/0285792 A1* | 11/2010 | Chen et al. | 455/422.1 |
| 2010/0323625 A1* | 12/2010 | Kishigami | H04B 7/0434 455/65 |
| 2010/0323709 A1* | 12/2010 | Nam | H04B 7/043 455/450 |
| 2010/0323740 A1* | 12/2010 | Hunt | H04L 5/0041 455/513 |
| 2012/0026964 A1* | 2/2012 | Koivisto et al. | 370/329 |
| 2012/0106473 A1* | 5/2012 | Tiirola | H04L 5/0048 370/329 |

OTHER PUBLICATIONS

WOASiS, "Downlink Multi-Cell Demodulation Reference Signal Design", 3GPP TSG-RAN WG1 #57bis, Jun. 29-Jul. 3, 2009, pp. 1-7.

Qualcomm Europe, "DM-RS in Support of UL MIMO and TxD", 3GPP TSG-RAN WG1 #57bis, R1-092715, 2009, pp. 1-17.

\* cited by examiner

| INDEX | DRS |
|---|---|
| IND# 1 | DRS 1 |
| ⋮ | ⋮ |
| IND# i-1 | DRS i-1 |
| IND# i | DRS i |
| IND# i+1 | DRS i+1 |
| ⋮ | ⋮ |
| IND# N | DRS N |

FIG. 2

| INDEX | DRS |
|---|---|
| IND# 1 | DRS 1 |
| ⋮ | ⋮ |
| IND# j-1 | DRS j-1 |
| IND# j | DRS j |
| IND# j+1 | DRS j+1 |
| ⋮ | ⋮ |
| IND# N | DRS N |

FIG. 3

METHOD FOR OPERATING A RADIO STATION IN A MOBILE NETWORK

FIELD OF THE INVENTION

The present invention relates to a method of communication in a communication system like a mobile communication system, for example UMTS, LTE or LTE Advanced.

More specifically, the invention relates to a method of communication using beamforming and, in some exemplary embodiments of the invention, cooperative beamforming, i.e. beamforming obtained by using primary station antennas from different cells.

BACKGROUND OF THE INVENTION

In a cellular telecommunication system as illustrated in FIG. 1, like a UMTS or LTE system, a plurality of secondary stations 110a-d like User Equipments, communicate within a cell 100a with the primary station 101a operating the cell. In such a system, the primary station 101a and the secondary stations may each comprise an antenna array comprising a plurality of antennas. These antennas may be used to communicate in a MIMO mode by beamforming. Complex coefficients applied on the transmitting antennas of the transmitting station, here the primary station 101a and/or on the receiving station, here the secondary stations 110a-d enable the creation of communication streams each of which are associated with one or more spatial channels.

A spatial channel is defined by the combination of transmission parameters like a modulation sequence, a time/frequency resource, and/or the beamformed stream. Thus, this permits to reach high data rates, and increased communication range.

To achieve such beamforming communication, the secondary stations and the primary stations typically need to be synchronised (i.e. operate with a common time frame) and to have a common phase reference. Reference symbols may be used to facilitate the timing synchronization and to achieve demodulation of the communication stream in a beamforming communication mode. A reference symbol has a predetermined transmitted value which permits the receiving station to have for instance substantially the same phase reference as the transmitting station, or to estimate channel conditions, so that a suitable modulation and coding scheme may be selected at the transmitting station.

In the case of a secondary station receiving a plurality of spatial channel, it is recommended to have at least one reference symbol (preferably a set or sequence of several reference symbols) corresponding to each spatial channel. However, and for instance in the case of the secondary station 110d which is at the edge of the cell 100a, the reference symbols transmitted from a primary station 101b of a neighboring cell 100b may collide with the reference symbols associated with spatial channels of cell 100a. There is thus a need to avoid or mitigate the effects of such collisions.

This problem of collision may also happen between reference symbols of a single cell, for example, where reference symbols are transmitted to more than one secondary station.

SUMMARY OF THE INVENTION

It is an object of the invention to propose a method for operating a primary station which alleviates the above problems.

It is another object of the present invention to propose a method enabling a reduction of the risk of collision between reference symbols.

In accordance with a first aspect of the invention, a method is proposed for operating a primary station comprising means for communicating with a plurality of secondary stations, the method comprising the primary station transmitting to a secondary station a subset of reference symbols selected out a set of possible reference symbols, the reference symbols of the subset being associated with a spatial channel, wherein a transmission characteristic of the subset of reference symbols depends on the spatial channel.

In accordance with a second aspect of the invention, a method is proposed for operating a secondary station comprising means for communicating with at least one primary station, the method comprising the secondary station receiving from the primary station a subset of reference symbols selected out a set of possible reference symbols, the reference symbols of the subset being associated with a spatial channel, wherein a transmission characteristic of the subset of reference symbols depends on the spatial channel.

In accordance with a third aspect of the invention, it is proposed a primary station comprising means for communicating with a plurality of secondary stations, the primary station comprising means for transmitting to a secondary station a subset of reference symbols selected out a set of possible reference symbols, the reference symbols of the subset being associated with a spatial channel, wherein a transmission characteristic of the subset of reference symbols depends on the spatial channel.

In accordance with a fourth aspect of the invention, it is proposed a secondary station comprising means for communicating with at least one primary station, the secondary station comprising means for receiving from the primary station a subset of reference symbols selected out a set of possible reference symbols, the reference symbols of the subset being associated with a spatial channel, wherein a transmission characteristic of the subset of reference symbols depends on the spatial channel.

As a consequence, the reference symbols associated with a spatial channel may be selected depending on the index of the spatial channel, limiting the risk of collisions between reference symbols of different spatial channels. Moreover, it is possible to shuffle the allocation of reference symbols subsets so that neighboring cells use in priority different reference symbols subsets, as will be shown in the above described embodiments. In several examples of the invention, the subsets of reference symbols are allocated so that coexisting reference symbols are orthogonal or substantially orthogonal one to another. In those instances where the reference symbols are not orthogonal, the effects may be mitigated, for example by avoiding use of the affected resources.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 2 is a diagram illustrating an example of the allocation of reference symbols in accordance with a first embodiment.

FIG. 3 is a diagram illustrating an example of the allocation of reference symbols in accordance with a second embodiment.

DETAILED DESCRIPTION OF THE INVENTION

Figure 1:
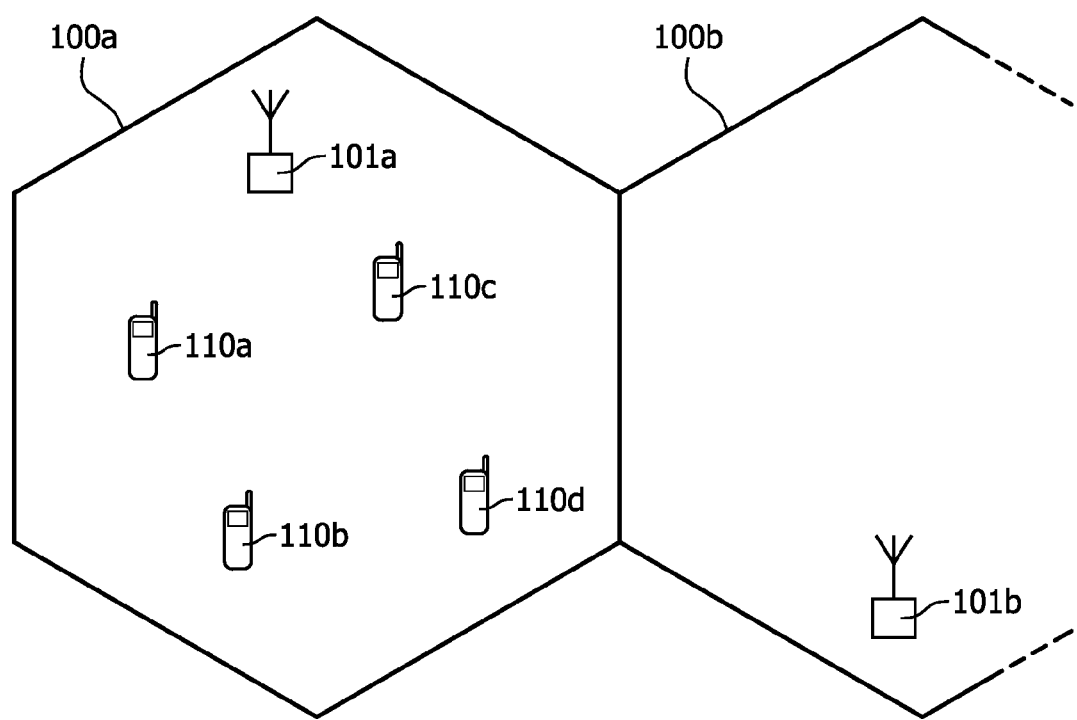
FIG. 1, already described, is a block diagram of a mobile communication system in which the invention is implemented.

The present invention relates to a mobile communication network as a UMTS or a LTE network, where each cell is operated by a primary station, which communicates with a plurality of secondary stations. Downlink communications from the primary station are carried out on a plurality of channels, some channels being dedicated to user data, and other channels to control data for signalling of transmission parameters for controlling the communications from the primary station to the secondary station. The channels may be defined by multiplexing of one or more of time, frequency or code. The same applies for uplink channels.

In an exemplary embodiment based on the LTE example, a single carrier of up to 20 MHz is used. A control signalling message for example on the Physical Downlink Control Channel (PDCCH) may be used to signal allocations of transmission resources. On the PDCCH, the primary station may signal transmission parameters, e.g. precoding vectors/matrices which allow the secondary station (or User Equipment noted UE) to compute phase reference(s) for demodulation of downlink data from common reference symbols. Reference symbols that are precoded specifically for a considered secondary station (UE specific Demodulation Reference Symbols or UE specific DRS) are also supported as an option, but only for a single spatial channel. A spatial channel may be defined by the combination of transmission parameters like a modulation sequence of values for successive reference symbols, a time/frequency resource, and/or a beamformed stream.

In the advanced forms of LTE networks, UE specific DRS are also proposed to aid reception of downlink data transmissions from the primary station. The DRS may occupy some of the resource elements (REs) in each resource block. Transmission of multiple spatial channels to a secondary station would require a set of DRS for each spatial channel. The set of DRS for each spatial channel is precoded in the same way as the data symbols for that spatial channel, and since the locations and symbol values of the DRS are known to the secondary station, they can be used as a phase and amplitude reference for demodulation of data transmitted on that spatial channel. Equivalently, the DRS can be used to obtain a channel estimate of the combined channel formed by the precoding and the radio channel. The precoding for a spatial channel can be considered to create an antenna port and the set of DRS for that spatial channel are thus transmitted on the corresponding antenna port.

The set of DRS for each spatial channel could be distinguished by one or more characteristics such as:
  Modulation Sequence: i.e. different sequences of predetermined values for successive reference symbols
  Frequency domain (FDM) i.e. the REs used for sending DRS differ in the frequency domain with e.g. different frequency carriers;
  Time domain (TDM) i.e. the REs used for sending DRS differ in the time domain;
  Code domain (CDM) i.e. different spreading sequences are applied to the transmitted symbols comprising the DRS. In this case it would be convenient to use the same set of REs for sending each set of DRS for each spatial channel.

In practice the DRS for a given spatial channel may comprise aspects of more than one distinguishing characteristic such as: Modulation Sequence, FDM, TDM, and CDM. For a given secondary station, it would be advantageous if no data is sent (on any spatial channel) in any RE used for DRS since this would avoid any interference between data and the DRS which would otherwise reduce the accuracy of the channel estimate obtained by the secondary station. This would imply that the REs used for any DRS on any spatial channel are not available for data. Moreover, in accordance with an example of this embodiment, the sets of DRS, for example, for different spatial channels, are mutually orthogonal, or at least orthogonal for part of the set, so that independent channel estimates can be obtained in the case that more than one set of DRS are transmitted at the same time. Two sets or subsets of DRS are orthogonal when their product equals zero. For instance, in case of TDM, two symbols are orthogonal if they are not overlapping in time. For FDM, two symbols are orthogonal if their respective frequency carriers are different. For CDM, two symbols are orthogonal if the product of their respective spreading sequences equals zero.

In the following descriptions of embodiments reference is made to Resource Blocks. In general, for embodiments based on LTE this term is intended to refer to Resource Blocks as defined for LTE (i.e. a given number resource elements in time and frequency domain). However, in further variations on such embodiments the term may also be understood to refer to part of a Resource Block (RB) as defined for LTE, for example an RB may be sub-divided into sub-blocks in time/and/or frequency, each sub-block having a defined location within the RB.

In principle the maximum number of spatial channels which could be supported with orthogonal DRS for a single Resource Block would depend on the modulation order and the total number of REs allocated for DRS (i.e. maximum number of orthogonal sequences available). In practice the maximum is likely to be set at a lower level, for example such that the total number of REs allocated to DRS is equal to a multiple of the maximum number of allowed spatial channels, e.g. a set of 2 DRS for each spatial channel.

Then, the following are among the possible ways of designing the system:
  The number REs allocated for DRS is proportional to the number of spatial channels actually transmitted to a secondary station UE. This would be applicable for FDM or TDM. It has the advantage of minimising the overhead from DRS when fewer spatial channels are transmitted than the maximum.
  The number REs allocated for DRS is fixed (e.g. as a multiple of the maximum number of spatial channels which may be transmitted to a secondary station). This would be a natural consequence of using CDM. For FDM and TDM as well as CDM it would also allow different spatial channels to be transmitted to more than one secondary station simultaneously. This would require that a UE was aware of which set (or sets) of DRS it should use as references for receiving its data (and which DRS corresponds to which part of the data stream).

However, as explained above and illustrated on FIG. 1, a secondary station 110d at the edge of cell 100a may receive DRS simultaneously from more than one cell, here from cell 100b. In this case it is convenient to operate the system such that the same frame timing is used in adjacent cells and also such that DRS from different cells can be distinguished (e.g. by Modulation Sequence/FDM/TDM/CDM). If the secondary station 110d can identify different DRS from different cells 100a or 100b, and has multiple receive antennas then it opens the following possibilities:

in an example, the secondary station 110d may receive a data transmission from a wanted cell and adjust its receive weights to reject the spatial channels from other cells.

on the contrary, the secondary station 110d may adjust its receive weights for receiving simultaneously data transmissions from a plurality of cells, here 100a and 100b (e.g. using different spatial channels and different DRS).

Thus, it is advantageous for the secondary station to be able to distinguish DRS from different cells using different characteristics, such as spreading sequences (or spreading codes), as long as this would not increase the number of REs needed for DRS. However the performance of this spreading approach is lower with rapidly changing channels. As an example, it is proposed in accordance with an embodiment of the invention, that the DRS from different cells are orthogonal (or nearly orthogonal).

In the particular example of LTE, an implementation of such a system would be as follows:

The maximum number of spatial channels which may be transmitted to one UE in one cell is 8. Note that in itself this would limit the total number of spatial channels being transmitted in a cell.

The number of REs for DRS in one RB may be a number such as 12 or 24.

It is assumed that the DRS design will allow some interpolation of the channel coefficients across one Resource Block, at least in some circumstances.

Considering these constraints there is a significant chance that DRS with the same characteristics would be received by a secondary station from two different cells, which would lead to significant errors in channel estimation. This problem of colliding DRS could affect a large part of the system bandwidth and persist for significant periods of time (for example if the same secondary stations are scheduled in successive subframes). It is said that two DRS are colliding if the two DRS are interfering together so that the receiving station may not be able to extract the phase reference or channel estimate.

As a consequence, in accordance with an embodiment of the invention, the primary stations are configured to allocate a subset of reference symbols, like DRS, to a spatial channel. This allocated subset is selected out a set of possible reference symbols available for the considered cell. In order to differentiate the DRS from DRS that could be transmitted in neighboring cells, a transmission characteristic of the subset of reference symbols depends on the spatial channel. Such a transmission characteristic may be chosen over any domain such as, Modulation Sequence, CDM, FDM, TDM, alone or in combination, for instance at least one of a modulation sequence, spreading sequence and a time/frequency resource element. Thus, the probability of colliding DRS is reduced (i.e. the probability that the DRS occupy the same time, frequency spreading sequence and modulation sequence).

In order to further reduce the risk of collisions of reference symbols, in a variant of the first embodiment, the subset of DRS are chosen to be orthogonal to other DRS transmitted either within the same cell or within a neighboring cell. This is possible, for instance, if the selection of the allocated subset depends on the identity of the cell. Thus, this permits the shuffling of the subsets of DRS from one cell to another. Then, the selection of DRS from one cell to another is done such as to allocate different orthogonal subsets. It is to be noted that it is also possible that a single primary station operates for a plurality of cells, and is thus aware of the use of the DRS in the various cells. This permits orthogonal DRS to be chosen.

The same may apply for a secondary station receiving simultaneously a plurality of subsets of DRS.

In an example of the preceding embodiments, the allocation of resources is done as illustrated on FIGS. 2 and 3. FIGS. 2 and 3 show two lists of DRS contained in the cell. These lists may be identical in this embodiment. However, in a variant of this embodiment, the lists are different in the sense that the DRS of a first list are at least not all included in a second list of DRS contained in a second cell. Another variant of this embodiment uses two different lists including the same elements but in a different order.

As shown on FIGS. 2 and 3, the elements 200 and 300 of the lists are in the same order. When the cell having the list in FIG. 2 associates DRS with spatial channels, it begins from the starting value of the list 201 and allocates the DRS sequentially from this starting point. Similarly, another cell the list in FIG. 3 list starts with the starting point 301. Thus, the DRS are allocated in a priority order which is different for each cell, and it permits to avoid collisions. Preferably, the DRSsin the lists are mutually orthogonal.

The starting value of the DRS in the list may depend on the cell identifier so that two neighboring cells have different starting points.

This latter variant is however only an example, since the subset of reference symbols may chosen on the basis of other parameters enabling the shuffling of the DRS, reducing thus the risk of collisions. As examples, the subset of reference symbols may depend on at least one of the following:

An identifier of the secondary station

An identifier of the primary station

A subframe number

An OFDM symbol number

A resource block index

A sub-block location within a resource block

An index to a group of resource blocks

A carrier frequency

A carrier index.

Moreover, it is possible to use a DRS hopping scheme where the DRS varies with the time in accordance with a predetermined sequence. The sequences are predetermined and known by each secondary stations of the cells. Each cell may have a determined set of one or more sequence, this set being different from the neighboring cells sets.

In order to achieve the advantages of having different DRS in different cells, in another embodiment, the following is proposed:

The DRS for different spatial channels are distinguished by CDM, and each spatial channel is associated with a DRS spreading sequence. A DRS spreading sequence is composed of complex values.

In order to allow interpolation of channel coefficients across an Resource Block, the DRS spreading sequence length should (preferably) be a sub-multiple of the number of REs allocated for DRS in one Resource Block. A different channel estimate could be derived for each repetition of the spreading sequence across the Resource Block. Alternatively interpolation would be possible if estimates of the channel coefficients can be derived using only parts of the spreading sequence.

The different DRS spreading sequences are orthogonal (or almost orthogonal).

Then there are two main possibilities for allocation of DRS sequences:

Case 1. Spatial channels in a given cell may be associated with any of the possible DRS spreading sequences Or Case 2. Spatial channels in a given cell may be associated with only a restricted subset of the possible DRS spreading sequences We note that for both case 1 and case 2 it would be advantageous to have more DRS spreading sequences than the maximum number of spatial channels which can be transmitted to a single secondary station. This greater choice of DRS spreading sequences would potentially allow the probability of collisions between DRS spreading sequences from adjacent cells to be reduced.

In both case 1 and case 2 it would be possible to allow any arbitrary association between a spatial channel and a DRS spreading sequence. Then the eNB would signal to the UE (e.g. via PDCCH) the number of spatial channels it should receive (on PDSCH) and which DRS spreading sequence corresponded to each spatial channel. However this would require significant signalling overhead in the case of many spatial channels to a single secondary station. A simpler approach would be that the DRS spreading sequences in a set are assigned to each spatial channel in the order in which they are listed in the set. In this case the eNB would signal to the secondary station the number of spatial channels and the DRS spreading sequence associated with the first spatial channel. Further spatial channels for that secondary station would be associated consecutively with the remaining DRS spreading sequences in the set.

Following case 1: "Spatial channels in a given cell may be associated with any of the possible DRS spreading sequences". Since it is likely that not all possible spatial channels (and DRS spreading sequences) in any cell will be used, in order to help ensure that different DRS spreading sequences are used in adjacent cells, it is proposed the following:

The DRS spreading sequences are assigned to each spatial channel in a cell sequentially (or preferentially sequentially)

The DRS spreading sequence assigned (or preferentially assigned) to the first spatial channel used in a cell is derived from the cell ID, such that different cell IDs typically lead to different DRS sequences for the first spatial channel Following case 2: "Spatial channels in a given cell may be associated with only a restricted subset of the possible DRS spreading sequences", it is proposed the following:—

The set of DRS spreading sequences which may be used in a given cell is derived from the cell ID, such that different cell IDs typically lead to different sets of DRS spreading sequences The DRS spreading sequences in a set are assigned to each spatial channel in the order in which they are listed in the set The ordering of DRS spreading sequences in the sets is designed such that when cell IDs lead to the two sets derived from different cell IDs having the same members, they are typically in a different order.

The ordering of DRS spreading sequences in the sets is designed so that when two cell IDs lead to the two sets derived from different cell IDs having the same members, at least the first, and preferably the first few, members of the sets are typically different. This would mean, for example, that two UEs each allocated a single spatial channel in adjacent cells would typically be assigned different DRS spreading sequences.

A simple scheme would be to generate the members of the set as consecutive integers with a starting value determined by the cell ID.

The above assumes that there would be a more or less static association between spatial channel and DRS spreading sequence, and that this would be chosen to avoid unwanted collisions between DRS sequence (e.g. in adjacent cells).

Another approach used in other embodiments would be to randomise the association. This may be achieved if the DRS spreading sequence associated with the first spatial channel assigned (or preferentially assigned) in a given Resource Block, is derived using one or more of:

a predetermined offset (e.g. signalled to a given UE)
the cell ID
the UE ID
the subframe number
an OFDM symbol number
a resource block index (e.g. in the frequency domain)
A sub-block location within a resource block
an index to a group of resource blocks
the carrier frequency (in absolute frequency)
a carrier index (e.g. within a set of component carriers)

This thus provides "DRS hopping", meaning that a collision between non-orthogonal DRS from different cells in one subframe/resource block/carrier would most likely be avoided in a different subframe/resource block/carrier. In many cases, the characteristics of the non-orthogonal DRS would be known by transmitter and/or receiver, and therefore any collisions could be identified in advance and if necessary, the use of the resources where the collisions occurred could be avoided e.g. by suitable scheduling of transmissions. Another possibility is for the receiver to derive a phase reference or channel estimate by interpolation from adjacent frequency domain resources where there are no collisions. Since according to the invention, DRS from different cells can be made orthogonal, at least in some of the time/frequency resources, then the different DRS would preferably be arranged to overlap with each other and not overlap with data transmissions from any cell (at least under the assumption that DRS symbols are transmitted with a similar power to data symbols). This differs from the use of common reference symbols (CRS) defined in LTE Release 8, where the specification provides the possibility for the CRS from different cells to occupy different frequency domain locations. In the design of LTE Release 8 it was considered advantageous for CRS to overlap with data from another cell, rather than CRS, since CRS symbols are typically transmitted with higher power than data symbols.

In another variant of this embodiment implemented in a system like LTE, the secondary station is informed by signalling (or can deduce) the number of downlink antennas available in a cell, and can therefore deduce the set of DRS spreading sequences which are potentially available. A secondary station is informed by signalling (e.g. of an index relative to the first member of the set giving the first member of the subset) of the subset of DRS which may be used for downlink transmissions to that UE. This assumes that the size of the subset is equal to the maximum downlink transmission rank (i.e. maximum number of spatial channels). In a PDCCH message the UE is informed of the transmission rank (R) of a downlink transmission on PDSCH and assumes that the first R DRS spreading sequences from the subset are associated with the respective R spatial channels.

In another variant of the previous embodiments, the allocation scheme of DRS is similar to the first embodiment, except that the first member of the subset of DRS spreading sequences is determined from the cell ID. In variations of this embodiment the subset of DRS sequences may be determined by one or more of the subframe number
a resource block index (e.g. in the frequency domain)
A sub-block location within a resource block
An OFDM symbol number
the carrier frequency (in absolute frequency)
a carrier index (e.g. within a set of component carriers)

As a variation, the DRS differentiated by spreading sequence may be additionally distinguished by having different modulation sequences and/or different symbol locations in time and/or frequency domain. One or more of these characteristics may be fixed (e.g. determined by other static system parameters such as antenna port number, semi-staically configured (e.g. via higher layer signaling) or dynamically configured (e.g. via physical layer signaling).

In a further embodiment based on LTE, the DRS for different spatial channels are arranged to be orthogonal partly by FDM (i.e. by means of different resource element allocation in the frequency domain), and partly by CDM (i.e. by means of different spreading codes). For DRS differentiated by CDM, a given RE allocated for DRS will be used to transmit a signal which is the sum of the DRS for more than one spatial channel. In the case of the spreading being applied in the time domain, this may lead to unequal total transmit power levels per OFDM symbol. To obtain more equal power balance the spreading code for each DRS is changed depending on the location of the REs in the frequency domain. This location may be defined at least partly in terms of sub-blocks within an RB. In a specific variation of this embodiment the set of spreading codes is a set of Hadamard sequences and the spreading sequences for different locations in the frequency domain are obtained by cyclic shifting of the sequences. In one version of this embodiment for 4 spatial channels the corresponding unshifted spreading sequences (occupying 4 REs) are:

(1,1,1,1)
(1,-1,1,-1)
(1,1,-1,-1)
(1,-1,-1,1)

With a cyclic shift of 1, the sequences become:

(1,1,1,1)
(-1,1,-1,1)
(-1,1,1,-1)
(1,1,-1,-1)

With a cyclic shift of 2, the sequences become:

(1,1,1,1)
(1,-1,1,-1)
(-1,-1,1,1)
(-1,1,1,-1)

etc

The cyclic shift used depends on the frequency domain location. As an example, for successive frequency domain locations the cyclic shift is increased by one. DRS for further spatial channels are additionally distinguished by FDM and also have a cyclic shift applied to their spreading sequences. To give better power balance between antennas locally (e.g. within a small number of RBs) it is advantageous for the cyclic shift for these DRS to be different, for example, for successive frequency domain locations the cyclic shift is decreased by one (or equavalentlly in this case, increased by 3). Thus the cyclic shift applied may depend on the spatial channel corresponding to the DRS. In a related embodiment, aiming to improve the uniformity of power level over time at a given frequency, the cyclic shift depends on the location in the time domain. The two embodiments can be combined so that the cyclic shift depends on both time and frequency location.

In another embodiment based on LTE there are 12 REs reserved for DRS for up to four spatial channels. The DRS for two spatial channels are distinguished by CDM. The CDM spreading sequences are defined across a minimum of two pairs of REs, separated in the frequency domain as follows:

|  | Spatial channel 1 | Spatial channel 2 |
| --- | --- | --- |
| Subcarrier 1 | (1, 1) | (1, −1) |
| Subcarrier 2 | (1, 1) | (−1, 1) |

Additional DRS can be distinguished by different non orthogonal scrambling sequences. Such DRS scrambling sequences sequence could be defined by:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 12N_{RB}^{max,DL} - 1$$

The pseudo-random sequence generator, c(i), would be initialised with $c_{init}=(\lfloor n_s/2 \rfloor+1) \cdot (2N_{ID}^{cell}+1) \cdot 2^{16}+n_{SCID}$ at the start of each subframe where $n_{SCID}$ may take values of 0 or 1 and may be signalled, for example dynamically via PDCCH.

Spatial channels 1 and 2 are supported by $n_{SCID}=0$ and spatial channels 3 and 4 are supported by $n_{SCID}=1$. This technique may have the disadvantage that the DRS for spatial channels 3 and 4 would not be orthogonal to those for spatial channels 1 and 2. In addition the implementation requirements are not clear for suppressing the interference between the sequences.

Therefore in this embodiment, additional DRS are distinguished by an orthgonal scrambling sequence. The previous approach is modified such that the DRS scrambling sequence for the additional spatial channels are orthogonal. This is done by modifying one sequence to generate a second orthogonal sequence. In this embodiment, since the first sequence is composed of QPSK symbols this is done by inverting every other symbol of the complex conjugate of the first sequence by multiplying by alternating inversion sequence {1,−1,1,−1,1,−1 ... ). More generally this could be done by inverting every other group of N complex conjugate symbols. A large number of other potential inversion patterns exist. The proposed sequence for this embodiment has the advantage of ensuring DRS orthogonality over the minimum number of REs. As a concrete example, the first DRS sequence could be defined by:—

$$r1(m) = \left(\frac{1}{\sqrt{2}}(1 - 2 \cdot c(2m)) + j\frac{1}{\sqrt{2}}(1 - 2 \cdot c(2m+1))\right)$$

$$m = 0, 1, \ldots, 12N_{RB}^{max,DL} - 1$$

And the second DRS sequence generated by:—

$$r2(m) = (1-2\cdot((m) \bmod 2)) \times r1(m)^* \quad m=0,1,\ldots, 12N_{RB}^{max,DL}-1$$

The first term of this equation is intended to generate the alternating inversion sequence. The ( )* denotes complex conjugate.

The pseudo-random sequence generator, c(i), would be initialised with $c_{init}(\lfloor n_s/2 \rfloor+1)\cdot(2N_{ID}^{cell}+1)\cdot 2^{16}$ at the start of each subframe. The parameter $n_{SCID}$ is now used in a different way to the previous method 1 (i.e. to enable or disable the use of the second sequence), but could still be signalled dynamically in a similar way.

This equation has the disadvantage that the sequences are not necessarily fully orthogonal within one RB. This can be addressed with a modification such as:—

$$r2(m) = \left(1 - 2 \cdot \left(m + \left\lfloor \frac{m}{3N_{RB}^{max,DL}} \right\rfloor\right) \bmod 2\right) \times r1(m)^*$$

$$m = 0, 1, \ldots, 12N_{RB}^{max,DL} - 1$$

This is intended to provide for adjusting the starting value of the inversion sequence for application to the URS appearing in different OFDM symbols, such that the successive inversion sequences are {1,−1,1,−1,1,−1 . . . ) and {−1,1,−1,1,−1,1, . . . ).

The result would be a pattern similar to the following for the 12 REs for the URS in a single RB, resulting in orthogonality over any group of 4 REs.

| 1 | −1 | 1 | −1 |
|---|----|---|----|
| −1 | 1 | −1 | 1 |
| 1 | −1 | 1 | −1 |

In a related embodiment the additional DRS have the same scrambling code but are distinguished by additional orthogonal spreading codes as follows:

|  | Layer 1 | Layer 2 | Layer 3 | Layer 4 |
|---|---|---|---|---|
| Subcarrier 1 | (1, 1) | (1, −1) | (1, 1) | (1, −1) |
| Subcarrier 2 | (1, 1) | (−1, 1) | (−1, −1) | (1, −1) |

These codes provide thus orthogonality between all four DRS.

In still another embodiment based on LTE the DRS for different spatial channels are arranged to be orthogonal partly by FDM (i.e. by means of different resource element allocation in the frequency domain), and partly by CDM (i.e. by means of different spreading codes). Adjacent cells are synchronized and at least two of the spatial channels within one cell or at least two different cells are differentiated by FDM. In order that the DRS for the different spatial channels do not suffer from interference from data transmissions, the resource elements (REs) used for the DRS for one spatial channel are reserved and not used for data transmission on the other spatial channel and vice-versa. The at least two different spatial channels from the same cell or at the least two different cells may be used for data transmission to the same secondary station or different secondary stations. The secondary station receiving a given spatial channel is made aware if any resource elements which may be used for that data transmission are reserved according to fixed system parameters, semi-static configuration or dynamic configuration.

In a variation of this embodiment, the power level of the DRS is used by a secondary station to establish an amplitude reference for receiving the data transmission on the corresponding spatial channel. If the at least two spatial channels are transmitted to different secondary stations and a secondary station is made aware of any resource elements which are reserved for other spatial channels, then the secondary station should assume an additional power offset between the received DRS power (e.g. in terms of energy per resource element) and the data symbol power. In the case that the secondary station is receiving a given number of spatial channels and the number of reserved resource elements corresponds to the same number of spatial channels, the power offset is assumed to be −3 dB. Different assumptions may be made in variations of this embodiment. For example, the secondary station may assume a fixed power offset (e.g. −3 dB) if any set of resource elements is reserved.

In a further embodiment based on LTE the DRS for spatial channels from two different cells may be differentiated by applying a frequency shift with respect to a reference position (e.g. a shift of an integer number of resource elements). The shift could be determined as follows:
Fixed or semi-statically configured frequency shift
Dynamically configurable frequency shift: There could be a fixed or semi-static default frequency shift.
Cell specific frequency shift by default, with optional semi-static or dynamically configurable frequency shift:
The frequency shift could be configured for all DRS to one secondary station or configured per CDM group or configured per antenna port.

In a variation of any embodiment where the DRS frequency shift is configurable, then the location of any REs reserved for other spatial channels is also separately configurable. This would help with mitigating intercell interference. For example, DRS could be made orthogonal between (time synchronized) cells by configuring reserved REs in the locations where the other cell is sending DRS.

It is to be noted that it is not essential that the stations are able to communicate in accordance with beamforming transmission mode.

This invention is applicable for mobile networks; like UMTS or UMTS LTE networks.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating at least one primary station to communicate with a plurality of secondary stations via spatial channels, the method comprising:
 in the at least one primary station:
  transmitting from a transmitter of the at least one primary station to a first secondary station of the plurality of secondary stations:

a first subset of demodulation reference symbols selected from among a set of possible reference symbols, the selection depending on a first characteristic of a first spatial channel, and wherein the reference symbols included in the first subset of reference symbols have an order of priority for assigning the reference symbols to the first spatial channel in a first cell, and transmitting from the transmitter of the at least one primary station to a second secondary station of the plurality of secondary stations in the first cell or in a second cell:

a second subset of demodulation reference symbols selected from among the set of possible reference symbols, the selection depending on the first characteristic or another characteristic of the first or a second spatial channel, and wherein the reference symbols in the second subset of reference symbols have a priority order for assigning the reference symbols to the first or the second spatial channels in the first cell or the second cell, wherein the respective first and second subsets of demodulation reference symbols are mutually different for use by the first and second secondary stations or the orders of priority are arranged in different orders of priority for use by the first and second secondary stations of the plurality of secondary stations communicating with the at least one primary station, wherein the order of priority of the second subset of demodulation reference symbols determines the order of allocation of the second subset of demodulation reference symbols to the first or the second spatial channel assigned to the second secondary station of the plurality of secondary stations, and a transmission characteristic of the first subset of demodulation reference symbols that the primary station transmits to the first secondary station of the plurality of secondary stations depends on one of the first or the second spatial channel assigned to the first secondary station, wherein each of the demodulation reference symbols of each subset run sequentially, and where a starting value of each subset of demodulation reference signals for a spatial channel depends on a respective spatial channel index, wherein the at least one primary station operates at least one of the first or second cells, and wherein the starting value is determined from an identifier of one of the first or second cell.

2. The method of claim 1, wherein the transmission characteristic of the reference symbols comprises at least one of the following: a modulation sequence, a spreading sequence, a cyclic shift to a spreading sequence, a scrambling sequence, and a plurality of time/frequency resource elements.

3. The method of claim 1, wherein the reference symbols of the first subset of reference symbols transmitted to the first secondary station are mutually orthogonal with reference symbols of at least one other subset of reference symbols transmitted to the first secondary station.

4. The method of claim 3, wherein the reference symbols of at the at least one other subset of reference symbols is obtained by multiplying a complex conjugate of each symbol of the first subset of reference symbols by a sequence comprising substantially equal numbers of symbols of positive value and symbols of negative value.

5. The method of claim 4, wherein the sequence comprising substantially equal numbers of symbols of positive value and symbols of negative value is a sequence of symbols successively alternating between a value of 1 and a value of −1.

6. The method of claim 1, wherein the reference symbols of the first subset of reference symbols transmitted to the first secondary station are mutually orthogonal to reference symbols of at least one other subset of reference symbols transmitted to the second secondary station.

7. The method of claim 1, wherein a portion of the first subset of reference symbols is arranged in both time and frequency domains and is mutually orthogonal to a corresponding portion of at least one other subset of reference symbols identically arranged in both time and frequency domains.

8. The method of claim 1, wherein the first subset of reference symbols further depends on at least one of the following:
an identifier of the secondary station,
a subframe number,
an OFDM symbol number,
a resource block index,
a sub-block within a resource block,
an index to a group of resource blocks,
a carrier frequency, and
a carrier index.

9. The method of claim 1, wherein the first subset of reference symbols further varies with time.

10. The method of claim 1, where the first spatial channel is associated with an antenna or an antenna port.

11. The method of claim 1 wherein the first and the second subset of reference symbols depend on an identifier of the primary station.

12. A method for operating a secondary station to communicate with at least one primary station, the method comprising:
in the secondary station:
receiving from the at least one primary station, a first subset of demodulation reference symbols selected from among a set of possible demodulation reference symbols, the selection depending on a first spatial channel,
wherein the reference symbols in the first subset of demodulation reference symbols have a priority order for assigning the demodulation reference symbols in said first subset to the first spatial channel; and
wherein the first subset of demodulation reference symbols have different priority orders of allocation of the demodulation reference symbols for use by a first cell and a second cell or the priority order is different for use by the first cell and the second cell communicating with the secondary station,
wherein the first subset of demodulation reference symbols is associated sequentially, and where a starting value of the first subset for a spatial channel depends on a respective spatial channel index,
wherein the starting value is determined from an identifier of one of the first or second cell.

13. A primary station comprising:
a computer processor configured to select a first subset of demodulation reference symbols from a plurality of ordered list of items contained in the primary station based on an identifier of the primary station, and further based on the plurality of ordered list of items, where each item in the plurality of ordered list of items comprises a subset of the possible reference symbols selected from a set of possible demodulation reference symbols, wherein the reference symbols in the first subset of demodulation reference symbols have a priority order for assigning the reference symbols to spatial channels in a first cell, wherein the first subset of demodulation reference symbols has a different priority order for the first cell and a second cell of a plurality of cells communicated from the primary station or subsets for use by the first and second cells have different priority orders, wherein the priority order for the first subset of demodulation reference symbols determines the respective order of allocation of demodulation reference symbols to a respective secondary station in the first and second cell, an antenna array comprising a plurality of antennas configured to transmit to the secondary station the first subset of reference symbols, and wherein a transmission characteristic of the first subset of demodulation reference symbols depends on an assigned spatial channel, wherein the first subset of demodulation reference symbols is associated sequentially, and where a starting value of the first subset for a spatial channel depends on a respective spatial channel index, wherein the starting value is determined from an identifier of one of the first or second cell.

14. The primary station of claim 13, wherein the transmission characteristic of the reference symbols comprises at least one of the following: a modulation sequence, a spreading sequence, a cyclic shift to a spreading sequence, a scrambling sequence and a plurality of time/frequency resource elements.

15. The primary station of claim 13, wherein the reference symbols of the first subset of reference symbols transmitted to the secondary station are mutually orthogonal with reference symbols of at least one other subset of reference symbols transmitted to the secondary station.

16. The primary station of claim 13, wherein the reference symbols of the first subset of reference symbols transmitted to the secondary station are mutually orthogonal to reference symbols of at least one other subset of reference symbols transmitted to a further secondary station.

17. The primary station of claim 13, wherein the reference symbols of at the at least one other subset of reference symbols is obtained by multiplying a complex conjugate of each symbol of the first subset of reference symbols by a sequence comprising substantially equal numbers of symbols of positive value and symbols of negative value.

18. The primary station of claim 13, wherein the sequence comprising substantially equal numbers of symbols of positive value and symbols of negative value is a sequence of symbols successively alternating between a value of 1 and a value of −1.

19. The primary station of claim 13, wherein a portion of the first subset of reference symbols is arranged in both time and frequency domains and is mutually orthogonal to a corresponding portion of at least one other subset of reference symbols identically arranged in both time and frequency domains.

20. A secondary station comprising:

an antenna array configured to receive from at least one primary station a subset of demodulation reference symbols selected from a set of possible demodulation reference symbols, wherein the reference symbols in the subset have a priority order for assigning the reference symbols to assigned spatial channels, wherein the reference symbols in the subset depend on an identifier of the secondary station or have different priority orders of allocated demodulation reference symbols in the subset for use by different cells thereby depending on a cell of the primary station, wherein the priority order determines an order of allocation of the reference symbols in the subset to the secondary station, and a computer processor configured to utilize the received reference symbols in the subset to determine at least one of a phase and amplitude reference for demodulation of data transmitted on a subsequently assigned spatial channel, wherein the subset of demodulation reference symbols is associated sequentially, and where a starting value of the subset for a spatial channel depends on a respective spatial channel index, wherein the starting value is determined from an identifier of one of the first or second cell.

21. The secondary station of claim 20, wherein in addition to receiving the subset of reference symbols, the secondary station receives from the at least one primary station, a parameter indicating a number of the spatial channels and a demodulation reference symbol (DRS) spreading sequence associated with the subsequently assigned spatial channel.

22. The secondary station of claim 20, wherein the subset of reference symbols received from the at least one primary station further depends on at least one of the following:

an identifier of the secondary station,
a subframe number,
an OFDM symbol number,
a resource block index,
a sub-block within a resource e block,
an index to a group of resource blocks,
a carrier frequency,
a message received from the primary station, and
a carrier index.

* * * * *